United States Patent
Boron

(10) Patent No.: US 6,666,341 B2
(45) Date of Patent: Dec. 23, 2003

(54) RACK FOR FLAT RECTANGULAR ARTICLES

(75) Inventor: Joseph G. Boron, Capitol Heights, MD (US)

(73) Assignee: Joey Manic, Inc., Capitol Heights, MD (US)

(*) Notice: Subject to any disclaimer, the term of this patent is extended or adjusted under 35 U.S.C. 154(b) by 0 days.

(21) Appl. No.: 10/117,564

(22) Filed: Apr. 5, 2002

(65) Prior Publication Data

US 2003/0189017 A1 Oct. 9, 2003

(51) Int. Cl.$^7$ .............................. A47G 29/02; A47F 5/08
(52) U.S. Cl. ........................ 211/40; 211/87.01; 40/657; 40/124.4
(58) Field of Search .................. 211/40, 87.01, 211/71.01, 41.12; 40/657, 777, 778, 124, 124.4; D6/570, 571, 569, 562, 553, 467; D19/100, 99, 90, 86, 75

(56) References Cited

U.S. PATENT DOCUMENTS

| | | | | |
|---|---|---|---|---|
| 798,115 A | | 8/1905 | Ross | |
| 868,458 A | * | 10/1907 | Lentz | 40/778 |
| 4,577,765 A | * | 3/1986 | Crosby | 211/87.01 |
| 5,363,953 A | * | 11/1994 | Carter | D6/513 |

* cited by examiner

*Primary Examiner*—Daniel P. Stodola
*Assistant Examiner*—Erica B Harris
(74) *Attorney, Agent, or Firm*—Cohen, Pontani, Lieberman & Pavane

(57) ABSTRACT

A rack includes a flexible planar backboard to which pairs of flexible resilient loops are fixed in rows. The lower ends in each pair are spaced apart by a distance which is less than the transverse dimension of the article to be supported, while the upper ends are spaced apart at a distance which is greater than the transverse dimension. The backboard is preferably formed of sheet plastic less than 1.0 mm thick so that it can be rolled up. The loops may be formed of plastic tubing having end faces received against the backboard and retained by unformed rivets received through holes in the backboard. The loops can be formed integrally with the backboard by stamping out straps which remain attached at a proximal ends, and fixing the distal ends into apertures.

22 Claims, 3 Drawing Sheets

RACK FOR FLAT RECTANGULAR ARTICLES

BACKGROUND OF THE INVENTION

1. Field of the Invention

The invention relates to a rack for flat rectangular articles, in particular an upright display rack for CD's or DVD's.

2. Description of the Related Art

U.S. Pat. No. 798,115, issued to Ross in 1905, discloses a display board for seed packages which includes a board supported in an inclined position and a plurality of pairs of supporting wires or staples arranged at convenient intervals. The lower ends of the wires in each pair are spaced apart by a distance which is less than the transverse dimension of the seed packages, while the upper ends are spaced apart by a distance which is greater than the transverse dimension. Each supporting wire or staple is bent to form two legs at right angles to a straight crown section; the legs are driven into the board so that the crown is vertical when the board is in its inclined position. Both the board and the supporting wires are relatively stiff; it is a specific object for the straight crown sections to guide the packages being inserted between the upper legs of a pair.

Other prior art includes peg boards with custom formed wires for hanging tools. Here too there is little flexibility in either the board or the wires. As such the boards are relatively heavy and cannot be stored in a rolled condition. Further they are not transparent and do not provide any passage of light or visibility of background on the side opposite the display. There is no possibility to form the supporting wires without tools, and no suggestion that the supporting wires can be formed integrally with the board. Indeed, there is no suggestion that they can even be formed of the same material. Most prior art for holding or displaying objects includes rigid boards and custom formed wires which have little flexibility.

SUMMARY OF THE INVENTION

It is an object of the invention to provide a complete rack for flat rectangular articles, in particular CD's or DVD's, which can be stored in a rolled condition.

It is a further object to provide a rack which is light in weight and can be hung from a wall or supported in a frame.

It is a further object to provide a rack which can be assembled without tools.

It is a further object to provide a rack which can be stamped from sheet material so that the backboard and the supporting elements for CD's are integrally formed.

According to the invention, the backboard is flexible, and is preferably made of sheet plastic such as polycarbonate or polyethylene less than 1.0 mm thick. Flexible resilient loops are fixed to the backboard in pairs, each loop having a lower end, an upper end, and an arcuate section between the ends.

According to a first embodiment, the resilient loops are lengths of tubing with end faces received against a first side of the backboard and retained by unformed rivets received through holes in the backboard from the second side. According to a variation, mirror image loops can be fitted to the second side and held by pins passing through to the loops on the first side.

According to a second embodiment, the loops are formed integrally with the plastic sheet of the backboard by stamping straps from parallel slots in the sheet, each strap having a proximal end integrally attached to the sheet, and a distal end which is attachable to the backboard remote from the slot. The distal ends are preferably formed with shoulders for retention in apertures punched between the slots, each aperture accommodating the distal ends of two adjacent straps. This embodiment is especially economic to manufacture, since it does not require separate parts for the loops, and does not require any assembly by the manufacturer. It also requires a minimum of space for shipping and storage since it can be rolled up prior to fixing the distal ends in the apertures.

According to a third embodiment, triangular retaining members are punched from plastic sheet which may be the same material as the backboard. Each retaining member has a bottom edge formed with a tab and two side edges which converge from the bottom edge to an apex. The retaining members are bowed so that the tab and the apex can be received in apertures punched in the backboard; the bottom edges of triangular sheet members are linearly aligned so that the adjacent side edges serve as retaining loops for a CD. The apices are spaced apart by slightly more than the transverse dimension of the CD and thus position it laterally.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
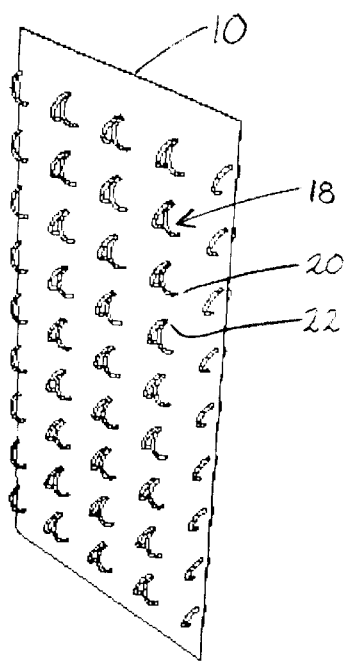
FIG. 1 is a perspective of a first embodiment of the CD rack according to the invention.
Figure 2:
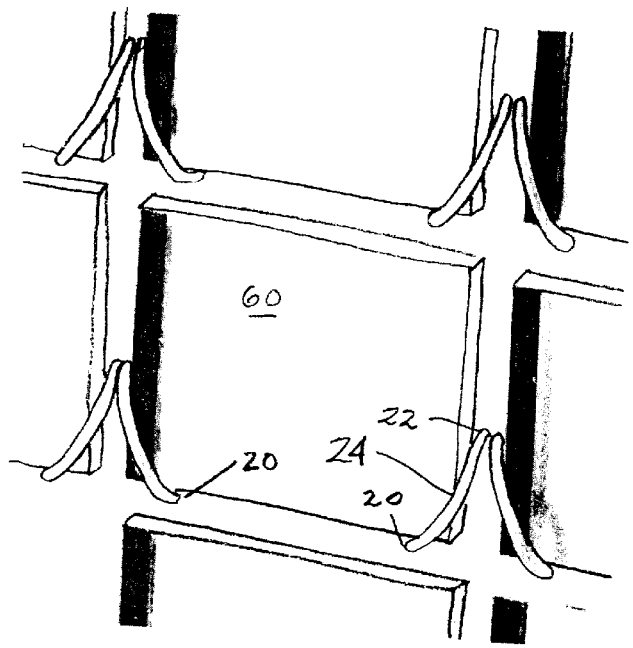
FIG. 2 is an enlarged partial perspective of the CD rack with CD's in place.

Referring to FIG. 1, a CD rack according to the invention includes a flexible backboard 10 having a first side 12 to which a plurality of flexible resilient loops 18 are fixed in pairs. The lowers ends 20 of each pair are spaced apart by a first distance which is less than the transverse dimension of a CD case or jewel box (14 cm×12.4 cm), while the upper ends 22 of each pair are spaced at a second distance which is greater than the transverse dimension. The upper ends 22 of each pair lie above and outside the corresponding lower ends 20, so that a CD or other rectangular article can be supported by each pair of loops 18. In the example of FIG. 2, the lower ends are centerlines spaced about 9.7 cm apart, so that they easily support the jewel box 60 along its transverse dimension. The upper ends are on centerlines 14.8 cm apart, so that they lie immediately outside the transverse dimension. The arcuate sections 24 of each loop 18 extend across the corners of each jewel box. Since the length of each loop is greater than the distance between points where its upper and lower ends are fixed to the backboard, the loops can hold a rectangular article of substantial depth, which in the case of a jewel box is 1.0 cm. If it is desired for a pair of loops to hold more than one CD, then the spacing of the ends and/or the length of the loops should be changed accordingly. Likewise, if it is desired to display DVD's or other articles having different dimensions than CD's, the spacing of the ends of the loops would be different.

The backboard 10 is preferably a highly flexible sheet plastic such as polycarbonate or polyethylene at a thickness of 0.020 in. or 0.030 in. (0.50 mm or 0.75 mm). Such sheets have a bending radius of less than 4 inches and are highly resilient. This permits the rack to be shipped and stored in a rolled condition, and to assume a flat shape when unrolled. Since polycarbonate has better dimensional stability and heat resistance than polyethylene, the smaller thickness is suitable. The thickness and material chosen will depend to some degree on the loading, since bowing of the backboard would be undesirable. For aesthetic reasons, the sheet material is preferably translucent, since this will transmit light and permit a background such as wallpaper to be seen from the opposite side. Translucence may be achieved by providing a transparent sheet with a pearl finish, i.e. a surface topography which diffracts light and lends a milky appearance.

Figure 3:
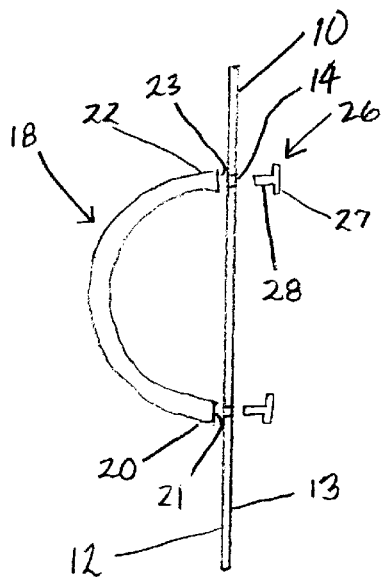
FIG. 3 is an exploded side view showing loop retention to one side of the backboard.

Referring now to FIG. 3, the loops 18 are preferably made of plastic tubing which is cut to form a lower end face 21 and an upper end face 23 which are placed against the first side 12 of the backboard 10 over holes 14 and held in place by retainers 26. The retainers are preferably nail-like members such as rivets, each having a head 27 which is received against the second side 13 of the backboard, and a shank 28 which is received through a hole 14 and into a corresponding end face 21, 23 of the tubing loop. The tubing is made of a resilient plastic which not only tends toward a straight condition, giving it an arcuate shape, but firmly grips the shank of the rivet. In this regard, the ID of the tubing is chosen to be slightly smaller than the diameter of the rivet shank. The rivet shank 28 may be formed with an enlarged cross section such as a bulge or annular ridge toward its distal end to promote gripping by the tubing.

Figure 4:
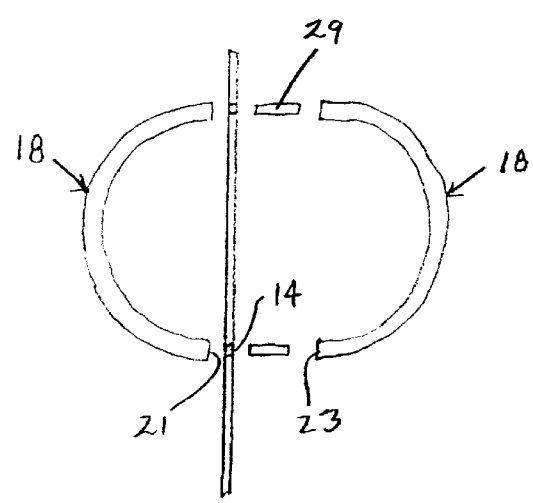
FIG. 4 is an exploded side view showing loop retention to both sides of the backboard.

FIG. 4 shows a variation of the first embodiment wherein loops of tubing are retained against opposite sides 12, 13 of the backboard 10 by pins 29 which are centered in holes 14 and have ends received in the end faces 21, 23 of tubing loops 18 on opposite sides 12, 13. Note that the dimensions of the holes 14 need not be precise since it is only necessary that they accommodate the pins or shanks without admitting the tubing.

Figure 5:
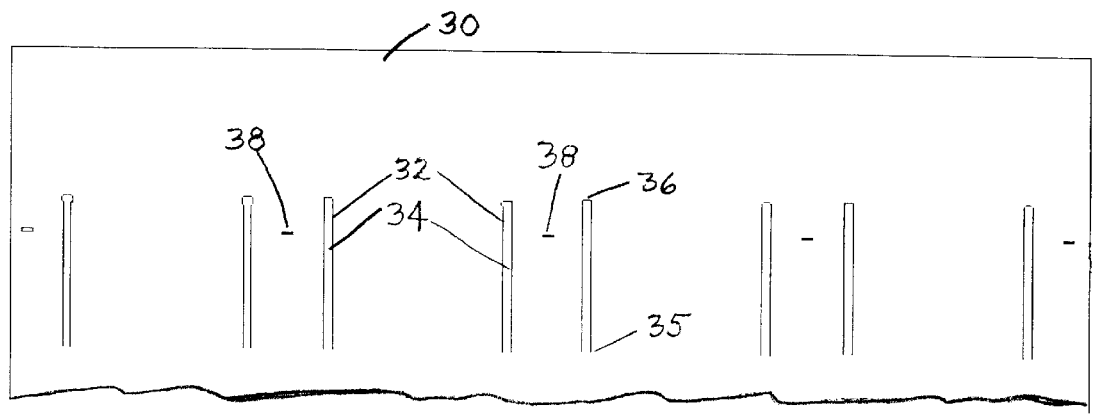
FIG. 5 is a partial plan view of a second embodiment having integral loops prior to assembly.
Figure 6:
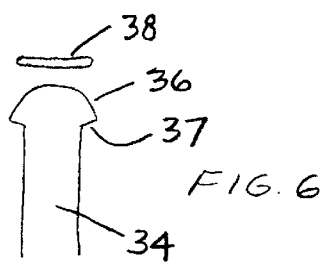
FIG. 6 is a close-up of the distal end of a strap and aperture.
Figure 7:
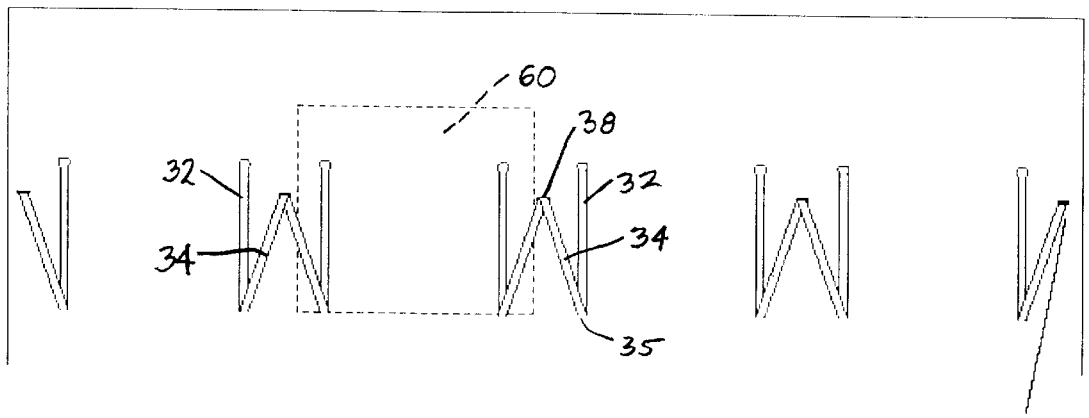
FIG. 7 is a partial plan view of the second embodiment as assembled.

FIG. 5 shows a second embodiment wherein a backboard 30, which is of like material and thickness as backboard 10, is punched to form pairs of slots 32 containing straps 34, each strap having a lower or proximal end 35 which is integrally attached to the backboard 30 at one end of the slot, and an upper or distal end 36 which is attachable to the backboard remotely from the slot. The backboard is provided with a pair of apertures 38 adjacent to and outside of each pair of slots 32. As shown in FIG. 6, each distal end 36 is provided with shoulders 37 which permit it to be retained in a corresponding aperture 38. In a preferred embodiment, some apertures 38 are shared by adjacent straps in adjacent pairs. As shown in FIG. 7, the distal ends 36 of straps 34 in adjacent pairs are both received in a single aperture 38, where the apertures lie between pairs. The slots 32, and therefore the proximal ends 35 of the straps, are spaced apart by a distance which is less than the transverse dimension of the jewel box or other item to be supported. The apertures 38, and therefore the distal ends 36 inserted therein, are spaced apart by a distance greater than the transverse dimension. It is contemplated that the CD holders of the second embodiment would be sold as stamped in a punch and die, as shown in FIG. 5, and assembled as shown in FIG. 7 by the end user.

Figure 8:
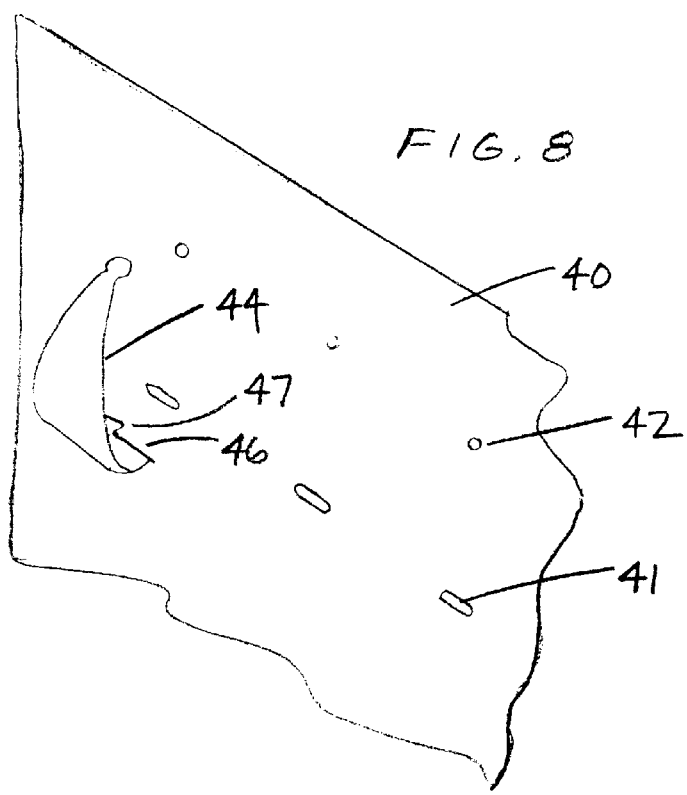
FIG. 8 is an exploded perspective of a third embodiment having triangular sheet retaining members.
Figure 9:
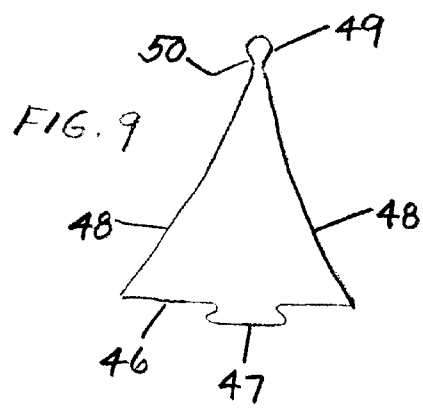
FIG. 9 is a plan view of a triangular sheet retaining member.

FIG. 8 shows a third embodiment wherein a backboard 40, which is of like material and thickness as backboard 10, is punched to form slots 41 and respective apertures 42 thereabove. The resilient loops are formed by triangular retaining members 44 which are cut from plastic sheet, preferably of the same type as the backboard, and bowed to assume an arcuate shape. As shown in FIG. 9, each retaining member is formed with a bottom edge 46 having a tab 47, side edges 48 which converge from said bottom edge 46 to an apex 49, and shoulders 50 formed on the apex. The tab 47 on the bottom edge 46 is received in a slot 41, while the apex 49 is received in an aperture 42, where it is retained by the shoulders 50.

Figure 10:
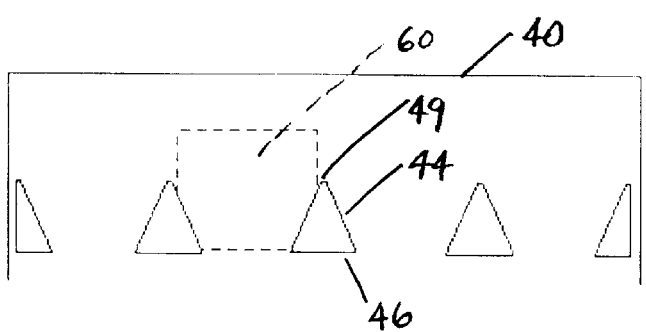
FIG. 10 is a perspective of the third embodiment as assembled.

FIG. 10 shows the triangular retaining members 44 as assembled to the backboard 40 in rows. The bottom edges in each row are linearly aligned and spaced apart by less than the transverse dimension of a jewel box 60, whereas the apices 49 are spaced apart by slightly more than the transverse dimension. The adjacent edges 48 of adjacent retaining remembers 44 therefore function as the resilient loops of the first and second embodiments. Note that the ends of the rows may be formed by half-sized right triangles, as shown, or may be formed as the other triangles, if the backboard is formed with a margin.

Any of the racks may be hung in a variety of ways. When loops are present on only one side, the rack may be hung on a wall. They may also be supported in metal frames, e.g. formed aluminum tubing, which can be supported on the floor by brackets and arranged to roll. Frames may also be hinged together so that they can assume oblique angles and thereby serve as free standing room dividers.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A rack for holding flat substantially rectangular articles in an upright position, each said article having a transverse dimension, said rack comprising a flexible planar backboard having a first side and a second side, at least one pair of flexible resilient loops, each said loop having a lower end and an upper end, at least one of said lower end and said upper end being separable from said backboard, each said lower end of each said loop being fixed to said first side of said backboard, each said upper end of each said loop being fixed to said first side of said backboard, and an arcuate section between said ends, said lower ends in each pair being fixed to points on said backboard which are spaced apart at a first distance, said upper ends in each pair being fixed to points on said backboard which are spaced apart at a second distance which is greater than said first distance, said upper ends of each pair lying above and outside the corresponding lower ends when said backboard is in an upright position, each said loop having a length which is greater than the distance between the points where its first and second ends are fixed to the backboard, such that at least one said rectangular article having a substantial thickness and a transverse dimension which is greater than said first distance and less than said second distance can be supported by each said pair of loops when said backboard is in an upright position.

2. The rack as in claim 1 comprising a plurality of pairs of said loops.

3. The rack as in claim 2 wherein at least some of said pairs are arranged in a row.

4. The rack as in claim 3 wherein said pairs are arranged in a plurality of rows.

5. The rack as in claim 3 wherein the lower ends of all of said loops in each said row are horizontally aligned when said rack is in an upright position.

6. The rack as in claim 1 wherein said backboard is provided with at least one pair of holes for fixing at least one of said lower ends and said upper ends of a respective pair of loops to said backboard.

7. The rack as in claim 6 wherein said loops are received through said holes to form loops on the second side of said backboard.

8. The rack as in claim 6 wherein said loops are formed of tubing which is cut to form faces on at least one of said lower ends and said upper ends, said faces being fixed to said first side over said holes, said rack further comprising retainers received in said end faces through said holes from said second side.

9. The rack as in claim 8 wherein each said retainer is formed as a nail-like member having a head and a shank, said head being received against said second side, said shank being received through said hole and into the end of said tubing.

10. The rack as in claim 8 wherein each said retainer is formed as a pin which protrudes from said second side, whereby it can be received in the end face of a piece of resilient tubing received against said second side.

11. A The rack as in claim 10 further comprising at least one additional pair of flexible resilient loops, each said loop of each said additional pair having a lower end fixed to said second side of said backboard, an upper end fixed to second side of said backboard, and an arcuate section between said ends, said lower ends in each pair being spaced at said first distance, said upper ends in each pair being spaced at said second distance, said upper ends of each pair lying above and outside the corresponding lower ends when said backboard is in an upright position, said loops being formed of tubing which is cut to form faces on at least one of said lower ends and said upper ends, said faces being fixed to said second side over said holes by receiving said pins in said faces, whereby, at least one said rectangular article can be nested in each said additional pair of flexible loops when said backboard is in an upright position.

12. The rack as in claim 1 wherein said backboard is provided with a grid of holes for fixing said lower ends and said upper ends of each said pair of loops in any of a plurality of positions.

13. The rack as in claim 1 wherein said backboard is formed of a sheet of synthetic material selected from the group comprising polycarbonate and polyethylene.

14. The rack as in claim 13 wherein said sheet is less than about 1.0 mm thick.

15. The rack as in claim 1 wherein said loops are formed integrally with said flexible backboard.

16. The rack as in claim 15 wherein each of said loops is formed as a strap punched from said backboard to form a slot, said lower end being a proximal end which is integrally attached to said backboard at one end of said slot, said upper end being a distal end which is attachable to said backboard remote from said slot.

17. The rack as in claim 16 wherein said backboard comprises an aperture adjacent to each said slot, said distal ends of said straps being retained in said apertures.

18. The rack as in claim 17 comprising a plurality of pairs of straps in a row, each pair of straps having one of said apertures therebetween, one said distal end from each of said pairs being received in each said aperture between said each of said pairs.

19. The rack as in claim 17 wherein said distal end of each of said straps is formed with a transverse dimension which is larger than said aperture, whereby said distal end can be retained in said aperture.

20. The rack as in claim 1 wherein said backboard is made of a light transmissive material.

21. The rack as in claim 1 wherein said first distance is less than 14 cm and said second distance is greater than 14 cm, whereby each said pair of loops can support at least one jewel box for a CD.

22. The rack as in claim 1 wherein each of said loops is discretely formed and subsequently attached to said backboard.

* * * * *